United States Patent
Ji et al.

(10) Patent No.: US 9,157,133 B2
(45) Date of Patent: Oct. 13, 2015

(54) HYDROTHERMAL OXIDATION METHOD FOR PRODUCTION OF ALKALI METAL DICHROMATE FROM CARBON FERROCHROME

(75) Inventors: Zhu Ji, Tianjin (CN); Jinsong Wang, Tianjin (CN); Zhong Zhang, Tianjin (CN); Yuqing Yang, Tianjin (CN); Aishan Wang, Tianjin (CN); Weiguo Song, Tianjin (CN); Xinjian Yin, Tianjin (CN); Qingting Wei, Tianjin (CN); Hongwei Ru, Tianjin (CN); Wenwen Zhang, Tianjin (CN); Haijun Mei, Tianjin (CN)

(73) Assignee: TIANJIN PASSION SCIENCE AND TECHNOLOGY CO., LTD., Tianjin (CN)

( * ) Notice: Subject to any disclaimer, the term of this patent is extended or adjusted under 35 U.S.C. 154(b) by 316 days.

(21) Appl. No.: 13/882,354

(22) PCT Filed: Nov. 2, 2010

(86) PCT No.: PCT/CN2010/078336
§ 371 (c)(1),
(2), (4) Date: Jun. 7, 2013

(87) PCT Pub. No.: WO2012/058801
PCT Pub. Date: May 10, 2012

(65) Prior Publication Data
US 2014/0341791 A1    Nov. 20, 2014

(51) Int. Cl.
*C22B 34/32* (2006.01)
*C01G 37/14* (2006.01)
*C01G 49/02* (2006.01)

(52) U.S. Cl.
CPC ............... *C22B 34/32* (2013.01); *C01G 37/14* (2013.01); *C01G 49/02* (2013.01)

(58) Field of Classification Search
CPC .......... C22B 34/32; C01G 49/02; C01G 37/14
USPC .................................................... 423/596, 597
See application file for complete search history.

(56) References Cited

U.S. PATENT DOCUMENTS

| | | | |
|---|---|---|---|
| 1,955,326 A | | 4/1934 | Demant |
| 2,866,686 A | * | 12/1958 | Bennetch ...................... 423/633 |

(Continued)

FOREIGN PATENT DOCUMENTS

| | | |
|---|---|---|
| CN | 101508466 A | 8/2009 |
| GB | 397434 A | 8/1933 |
| GB | 888189 A | 1/1962 |

OTHER PUBLICATIONS
International Search Report of PCT/CN2010/078336.

*Primary Examiner* — Anthony J Zimmer
(74) *Attorney, Agent, or Firm* — CUSPA Technology Law Associates, P.A.; Yi Li

(57) ABSTRACT

The present invention provides a hydrothermal oxidation method for producing alkali metal dichromate from carbon ferrochrome, and the method comprises the following steps: formulating an initial reaction liquid by mixing carbon ferrochrome, an alkaline substance and water, in which the actual addition amount of the alkali is controlled smaller than the theoretically required amount; adding the initial reaction liquid into a reaction kettle, charging an oxidizing gas into the reaction kettle, and allowing the reaction to proceed for 0.5 to 3 h at a temperature of 150° C. to 370° C. and a pressure of 2 Mpa to 24 MPa; carrying out solid-liquid separation, cooling the resultant filtrate to a temperature of −12° C. to −20° C. to precipitate crystals, and carrying out separation by centrifuge to obtain alkali metal dichromate solution; adding $CrO_3$ to the alkali metal dichromate solution until the degree of acidification reaches 100% or greater, concentrating the solution by evaporation, and cooling it to precipitate crystals, so as to afford alkali metal dichromate. The method has a simple process, is easy to control, and can directly produce sodium dichromate under hydrothermal conditions.

19 Claims, 1 Drawing Sheet

(56) References Cited

U.S. PATENT DOCUMENTS

| | | | |
|---|---|---|---|
| 3,932,598 A | * | 1/1976 | Cooper et al. ................ 423/596 |
| 3,933,972 A | * | 1/1976 | Bauwens et al. ................ 423/57 |
| 4,759,922 A | * | 7/1988 | Perrone ......................... 423/597 |
| 4,968,503 A | * | 11/1990 | Glissmann ...................... 423/57 |
| 5,250,274 A | | 10/1993 | Lonhoff et al. |
| 5,273,735 A | * | 12/1993 | Weber et al. .................. 423/596 |
| 5,482,690 A | | 1/1996 | Scherhag |

* cited by examiner

HYDROTHERMAL OXIDATION METHOD FOR PRODUCTION OF ALKALI METAL DICHROMATE FROM CARBON FERROCHROME

TECHNICAL FIELD

The present invention relates to the field of chemical engineering involving chromium, and specifically relates to a hydrothermal oxidation method for production of alkali metal dichromate from carbon ferrochrome in which alkali metal dichromate is prepared from carbon ferrochrome by using an alkali and oxygen gas under hydrothermal conditions, with ferric oxide and alkali metal chromate as side products.

BACKGROUND ART

The salt of dichromic acid, such as alkali metal dichromate, particularly sodium dichromate and potassium dichromate, is an important basic raw material in inorganic chemical engineering, and has been widely used in the fields of chemical engineering, metallurgy, pigments, tanning, dyeing and finishing, electroplating, medicine, etc.

For preparation of dichromate, there are mainly three production methods that have been industrialized. For example, in preparation of sodium dichromate, all of these methods employ sodium chromate solution as the starting material. In most countries, including China, a sulfuric-acid method is adopted, in which sodium chromate solution is acidified with sulfuric acid, as shown in $2Na_2CrO_4+H_2SO_4=Na_2Cr_2O_7+Na_2SO_4$, then concentrated by evaporation to precipitate sodium sulfate crystals that are then filtered out, and the filtrate is further concentrated by evaporation and then cooled to precipitate crystals, so as to afford the product sodium dichromate dihydrate. The chromate factories of Bayer AG (Germany) and of Corpus Christi, Tex., U.S. (both factories have been closed one after the other) used to produce sodium dichromate by an electrolysis method in which sodium chromate solution is fed into the anode chamber of an electrolytic tank having two chambers partitioned with an ion-exchange membrane, then electrolyzed into sodium dichromate under a direct current, and the liquid in the anode chamber is collected and evaporated to precipitate crystals to yield sodium dichromate dihydrate. Recently a similar method by the Qinghai Institute of Salt Lakes has also been published (see CN101481802A). A new chromate factory, built by Bayer AG (Germany) in Newcastle, South Africa, adopts a carbonation method in which sodium chromate solution is carbonated with pressurized carbon dioxide in a carbonation column, as shown in $2Na_2CrO_4+2CO_2+H_2O=Na_2Cr_2O_7+2NaHCO_3$, most sodium bicarbonate is precipitated as crystals because of its low solubility and then filtered out at a decreased temperature with the partial pressure of carbon dioxide maintained, and the obtained sodium dichromate solution is adjusted in degree of acidification and then evaporated to precipitate crystals, so as to yield sodium dichromate dihydrate (see U.S. Pat. No. 5,250,274, 1993 for related techniques).

Among the above methods for preparation of dichromate, the sulfuric-acid method and the carbonation method produce $Na_2SO_4$ and $NaHCO_3$ as side products, respectively, which result in a low economic effect; and the electrolysis method has high power consumption, and thus is yet to be improved.

SUMMARY OF THE INVENTION

Based on the current state of production techniques for dichromate, the present invention provides a method for preparing alkali metal dichromate from carbon ferrochrome as the raw material, in which direct preparation of alkali metal dichromate from carbon ferrochrome under hydrothermal conditions is achieved by using an alkali and oxygen gas under hydrothermal conditions and controlling the operation conditions in the process, while ferric oxide and alkali metal chromate can be produced as side products.

The present invention provides a method for producing alkali metal dichromate from carbon ferrochrome as the raw material, and the method is a hydrothermal process and mainly comprises the steps of (1) formulating the raw material carbon ferrochrome together with an alkali and water into an initial reaction liquid, in which the actual addition-to-theoretical-requirement ratio of the alkali is controlled smaller than the theoretically required value;

(2) adding the initial reaction liquid formulated in step (1) into a reaction kettle, charging an oxidizing gas into the reaction kettle, and allowing a reaction to proceed for 0.5 to 3 h at a temperature of 150° C. to 370° C. and a pressure of 2 MPa to 24 MPa; wherein $CO_2$ generated during the reaction exerts a catalytic function which directs the reaction to produce a mixed solution of alkali metal chromate and alkali metal dichromate with the latter being predominant; and (3) subjecting the reaction products from the reaction in step (2) to solid-liquid separation, cooling the resultant filtrate to a temperature of −12° C. to −20° C. to precipitate crystals, and separating the solution therefrom which is an alkali metal dichromate solution.

According to a specific embodiment of the present invention, the alkali metal dichromate solution obtained by the above method may be sold as it is as an alkali metal dichromate-rich solution (the degree of acidification of the alkali metal dichromate is 97% or greater), or may be further processed into a solid product of alkali metal dichromate by the following step:

(4) adding $CrO_3$ to the alkali metal dichromate solution obtained in step (3) until the degree of acidification reaches 100% or greater, concentrating the solution by evaporation, and cooling it down to precipitate crystals, so as to afford a solid product of alkali metal dichromate.

In the present invention, alkali metal dichromate is prepared during hydrothermal oxidation of carbon ferrochrome, and no acidifier or electrolysis is used. Compared to the three methods in the related art described above, the method of the present invention is simple and has a low cost of production.

Hereinafter, the principle of the process of the present invention will be described using sodium dichromate as the example.

Carbon ferrochrome, a ferrochrome containing a small amount of C and Si, is an important raw material for production of chromium-containing alloys, especially stainless steel. When carbon ferrochrome powder is suspended in sodium hydroxide solution under a hydrothermal condition, oxygen gas can oxidize the elemental Cr, Fe, C, and Si in the alloy to produce corresponding oxides via the following reactions:

$$C+O_2=CO_2 \qquad (1)$$

$$Si+O_2=SiO_2 \qquad (2)$$

$$2Fe+1.5O_2=Fe_2O_3 \qquad (3)$$

$$2Cr+1.5O_2=Cr_2O_3 \qquad (4)$$

The produced $CO_2$, $SiO_2$ and $Fe_2O_3$ further react with sodium hydroxide under a high temperature and a high pressure to synthesize corresponding sodium salts, as shown below:

$$CO_2+2NaOH=Na_2CO_3+H_2O \quad (5)$$

$$SiO_2+2NaOH=Na_2SiO_3+H_2O \quad (6)$$

$$Fe_2O_3+2NaOH=2NaFeO_2+H_2O \quad (7)$$

Although the possibility that $Cr_2O_3$ is partially converted into $NaCrO_2$ cannot be excluded, both $Cr_2O_3$ and $NaCrO_2$ will further undergo alkaline oxidation in the presence of oxygen and sodium hydroxide, sodium carbonate to produce sodium chromate, as shown below (production and oxidation of $NaCrO_2$ are omitted):

$$Cr_2O_3+1.5O_2+4NaOH=2Na_2CrO_4+2H_2O \quad (8)$$

$$Cr_2O_3+1.5O_2+2Na_2CO_3=2Na_2CrO_4+2CO_2 \quad (9)$$

In the research the inventors have surprisingly found that, during the hydrothermal oxidation of carbon ferrochrome, carbon dioxide ($CO_2$) acts as a catalyst that can acidify sodium chromate into sodium dichromate (Equation (10)), and the formed sodium bicarbonate enables further oxidation of $Cr_2O_3$ into $Na_2CrO_4$ (Equation (13)) and releases carbon dioxide to further acidify sodium chromate, thereby not only resulting in an oxidation ratio of chromium being greater than the addition-to-theoretical-requirement ratio of alkali (i.e., the utilization rate of alkali exceeds 100%), but also producing a sodium chromate-sodium dichromate solution having a degree of acidification greater than 50% or even 80% from which the products sodium chromate and sodium dichromate dihydrate each can be prepared by a simple separation method. Because during this process the $CO_2$ only accelerates the reactions of Equations (10) and (13) like a catalyst without depletion, in the present invention such an action of $CO_2$ acidifying sodium chromate into sodium dichromate and in turn allowing further oxidation of $Cr_2O_3$ into $Na_2CrO_4$ is simply referred to as "catalytic function of $CO_2$".

In a sealed autoclave at a temperature of about 300° C., the carbon dioxide produced from oxidation of carbon ferrochrome generally has a partial pressure $P_{CO2}$ of approximately $2\pm1$ MPa, and may exert acidification shown in Equations (10)-(12) under appropriate conditions, which not only produces $NaHCO_3$ (sodium bicarbonate, also called baking soda) but also separately acidifies sodium chromate into sodium dichromate, acidifies and polymerizes sodium silicate into easily filterable large-sized hydrated silica $SiO_2 \cdot xH_2O$ (thereby allowing for a highly pure, nearly silicon-free solution of sodium chromate and sodium dichromate), and allows sodium ferrite to hydrolyze into hydrated ferric oxide having a high specific surface area.

$$2Na_2CrO_4+2CO_2+H_2O \leftrightarrow Na_2Cr_2O_7+2NaHCO_3 \quad (10)$$

$$Na_2SiO_3+2CO_2+(x+1)H_2O=2NaHCO_3+SiO_2 \cdot xH_2O \quad (11)$$

$$2NaFeO_2+2CO_2+(y+1)H_2O=2NaHCO_3+Fe_2O_3 \cdot yH_2O \quad (12)$$

When the addition-to-theoretical-requirement ratio of alkali is lower than the theoretically required values of alkali in equations (8) and (9), the $NaHCO_3$ produced in Equations (10)-(12) enables alkaline oxidation like sodium hydroxide, and oxidizes, together with oxygen gas, unoxidized $Cr_2O_3$ into $Na_2CrO_4$, as shown below.

$$Cr_2O_3+1.5O_2+4NaHCO_3=2Na_2CrO_4+4CO_2+2H_2O \quad (13)$$

Equations (10) and (13) are combined to give:

$$Cr_2O_3+1.5O_2+2NaHCO_3=Na_2Cr_2O_7+2CO_2+2H_2O \quad (14)$$

Equation (10) represents a reversible reaction. If the pressure in the autoclave decreases (the autoclave is depressurized and vented), acidic sodium dichromate decomposes alkaline sodium bicarbonate (also called baking soda) and is converted back to sodium chromate with carbon dioxide released. If the pressure in the autoclave remains unchanged, because the temperature is as high as about 300° C., continuous production of sodium bicarbonate inevitably inhibits the reaction of Equation (10) from proceeding toward the right side. In order to promote the reaction of Equation (10) to continuously proceed toward the right side to produce more sodium dichromate, the sodium bicarbonate produced must be removed from the reaction system. However, when the reaction continues in the autoclave, it is not suitable to filter off sodium bicarbonate crystals by cooling during the process as in the current industry-scale production of sodium dichromate by the carbonation method. A preferred method in the present invention comprises decreasing the original addition-to-theoretical-requirement ratio of alkali, so that the sodium bicarbonate produced from acidification can act as an alkali source to replace the portion of sodium hydroxide that was originally planned to be added; and increasing the partial pressure of oxygen and properly prolonging the temperature holding time, so that sodium bicarbonate may allow further oxidation of unoxidized $Cr_2O_3$ into $Na_2CrO_4/Na_2Cr_2O_7$ via the reactions of Equations (13) and (14). Therefore, the sodium bicarbonate playing the role of sodium hydroxide will definitely result in (1) an oxidation ratio of chromium (the percentage of Cr(VI) out of total chromium) being greater than the addition-to-theoretical-requirement ratio of alkali shown in Equation (8); (2) the utilization rate of alkali (the oxidation ratio over the addition-to-theoretical-requirement ratio of alkali, as a percentage) exceeding 100%; (3) both sodium chromate and sodium dichromate being present in the solution, with the latter being even more than the former, i.e., with a degree of acidification greater than 50%, leaving the pH of the solution weakly acidic; and (4) an extra supply of $CO_2$ when sodium carbonate is used to partly or completely replace sodium hydroxide, which will increase the partial pressure of $CO_2$, i.e. $P_{CO2}$, so as to accelerate the acidification shown in Equation (10) and increase the proportion of sodium dichromate in the resultant solution, i.e., to increase the degree of acidification.

In the present invention, the presence of reactions of Equations (10) and (13) has been proved by the fact that the utilization rates of alkali in the experiments exceed 100%. For example, 100 g carbon ferrochrome powder, 1 liter water, and sodium hydroxide in an amount 80% of the theoretically required amount were put into a 3 L autoclave in which the oxygen gas amount was set to the theoretical amount, the initial pressure in the system was controlled at 8 MPa, and the temperature was increased to 280° C. to allow a reaction for 30 min; and as a result, the oxidation ratio was 89.61% and the utilization rate of alkali was 112.0%. In particular, Example 2 of the present invention more clearly demonstrates the catalytic function of $CO_2$, i.e., proves the presence of reactions of Equation (10) and (13) in the hydrothermal oxidation system. When a mixture of carbon ferrochrome powder, sodium hydroxide whose addition-to-theoretical-requirement ratio is 50% of the theoretically required value, and water is allowed to react for 2 h at 300° C., the oxidation ratio of chromium is as high as 80.75% which corresponds to a utilization rate of alkali of 161.5%, the filtrate is a sodium chromate-sodium dichromate solution having a pH of 4 to 4.5 and a degree of acidification of 80.38%. These results indicate that in the filtrate sodium dichromate is more than 80% and sodium chromate is less than 20%.

As describe above, the presence of the reaction of Equation (10) lays the foundations for the technique of industrialized production of sodium dichromate by the carbonation method in chromate industry. In the present invention, by properly controlling the hydrothermal condition, carbonation can be avoided, and a sodium dichromate solution with a high degree of acidification may be directly obtained after cooling, depressurizing, and venting the autoclave (without recycling sodium bicarbonate); and a sodium dichromate solution with an even higher degree of acidification may be obtained after filtering out sodium bicarbonate crystals at a decreased temperature with the partial pressure of carbon dioxide maintained.

The sodium dichromate solution with a high degree of acidification is cooled with a refrigerating fluid to a temperature of $-12°$ C. or lower, preferably to a temperature of $-15°$ C. to $-20°$ C., to precipitate unacidified sodium chromate in the form of its decahydrate crystal $Na_2CrO_4 \cdot 0.10H_2O$, and the separated sodium chromate decahydrate can be sold as it is or sold as sodium chromate tetrahydrate $Na_2CrO_4 \cdot 4H_2O$ or anhydrous sodium chromate prepared by a simple dehydration and drying method. The sodium dichromate solution from which sodium chromate decahydrate has been filtered off has a significantly increased degree of acidification, even increased to 97% or higher, in which case chromic anhydride $CrO_3$ may be supplemented in an appropriate amount to further increase the degree of acidification to 100% or slightly higher so as to convert all of the remaining sodium chromate into sodium dichromate, as shown in $Na_2CrO_4 + CrO_3 = Na_2Cr_2O_7$. Thereafter, the solution is concentrated by evaporation until the content of sodium dichromate is 90% or more, then cooled to 80° C. or lower to precipitate crystals of sodium dichromate dihydrate $Na_2Cr_2O_7 \cdot 2H_2O$ which are filtered and dried to yield sodium dichromate dihydrate as a qualified product (crystal sodium dichromate dihydrate $Na_2Cr_2O_7 \cdot 2H_2O$ is dissolved in its own water of hydration when heated to 84.6° C.). Therefore, the production of sodium dichromate dihydrate according to the present invention is simpler than the three industrialized methods in the related art.

In summary, the present invention provides a method for preparing sodium chromate and sodium dichromate from carbon ferrochrome as the raw material, in which sodium chromate is produced from carbon ferrochrome with an alkali and oxygen gas under a hydrothermal condition and then sodium dichromate is directly produced under a hydrothermal condition, by controlling the operation conditions in the process. In the method according to the present invention, the process is simple and easy to control, and represents an efficient, energy-saving, and clean production method.

EMBODIMENTS OF THE INVENTION

Hereinafter the implementation of the present invention and beneficial effects produced thereby will be described in detail with reference to embodiments and examples, so that the readers can better understand the solutions of the present invention. However, these embodiments and examples are not to be construed as any limits to the scope of application of the present invention.

Figure 1:
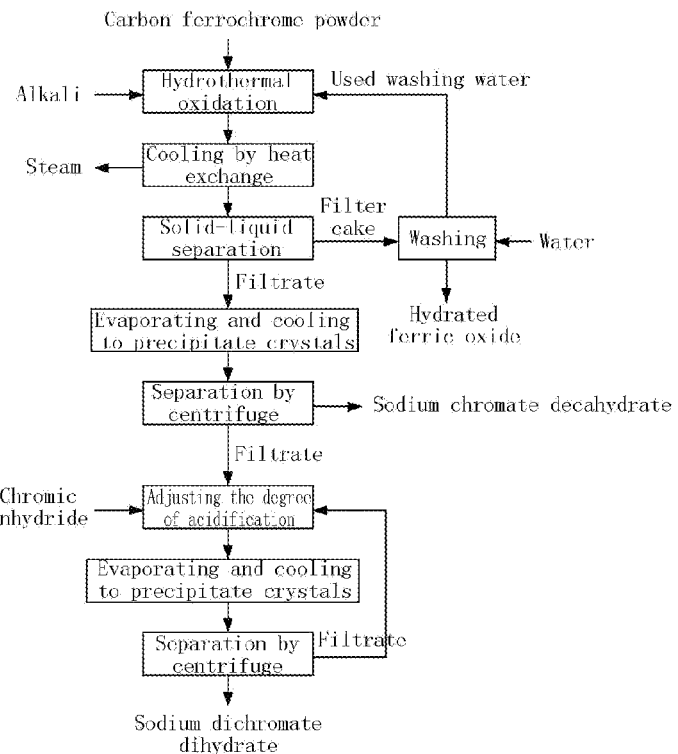
FIG. 1 is the flow chart of the process according to the present invention.

FIG. 1 is the schematic flow chart of the process according to the present invention. The method according to the present invention mainly comprises: adding fine powder of carbon ferrochrome, water and an alkali into an autoclave, charging oxygen gas thereto, and heating the system under stirring to allow reactions to start and proceed; when the reactions are over, cooling (by exchanging heat during steam recycling) the system and filtering out the filter cake which is hydrated ferric oxide, where the resultant filtrate is a solution of alkali metal chromate and alkali metal dichromate. The embodiment shown in FIG. 1 uses, for example, a solution of alkali metal chromate and alkali metal dichromate, which is concentrated and cooled to separate sodium chromate decahydrate therefrom to leave a sodium dichromate solution. The sodium dichromate solution may be sold as it is as a liquid product, or may be supplemented with a small amount of chromic anhydride to adjust the degree of acidification to 100% and then be evaporated and cooled and crystallized to afford the crystal product of sodium dichromate dihydrate.

According to a specific embodiment of the present invention, in the method for producing alkali metal dichromate from carbon ferrochrome as the raw material according to the present invention, the raw material carbon ferrochrome is one or more of high-carbon ferrochrome, medium-carbon ferrochrome and charge chrome (which has a Cr content of about 50%, and is relatively cheap), in which the contents of elements such as chromium, iron, carbon, and silicon all meet the relevant product standards. Before the initial reaction liquid is formulated, the carbon ferrochrome is pulverized to have a particle size smaller than 75 μm (corresponding to a mesh number of 200), preferably smaller than 43 μm (corresponding to a mesh number of 325).

According to a specific embodiment of the present invention, in the method for producing alkali metal dichromate from carbon ferrochrome as the raw material according to the present invention, the alkali metal dichromate is sodium dichromate, potassium dichromate, or lithium dichromate. The alkali used to formulate the initial reaction liquid is one or more selected from sodium hydroxide, potassium hydroxide, lithium hydroxide, sodium carbonate, potassium carbonate, lithium carbonate, sodium bicarbonate, and potassium bicarbonate. Among them, sodium/potassium hydroxide has the highest reactivity, followed by sodium/potassium carbonate, and then by sodium/potassium bicarbonate. However, sodium/potassium carbonate and sodium/potassium bicarbonate can provide extra $CO_2$ to increase the partial pressure of $CO_2$ ($P_{CO2}$), so as to enhance the catalytic function of $CO_2$, which helps increase the oxidation ratio and the degree of acidification and decrease the addition-to-theoretical-requirement ratio of alkali. Nevertheless, while the partial pressure $P_{CO2}$ is increased by sodium/potassium carbonate and sodium/potassium bicarbonate, the total pressure inside the autoclave is also increased, which lays down more requirements upon the material of the autoclave and the production operations. When the pressure resistance problem of the autoclave and relevant systems is solved to allow for both the reactivity and catalytic function of $CO_2$, the alkali to be used may be a mixed alkali, for example, a mixture of caustic soda and sal soda, or a mixture of sal soda and baking soda, but caustic soda and baking soda may not be used together in this case as contact of caustic soda NaOH with baking soda $NaHCO_3$ instantly produces $Na_2CO_3$. If the raw material carbon ferrochrome has a low carbon content, it is more suitable to use a mixed alkali. In the present invention, for each mole of Cr in carbon ferrochrome, the theoretically required amount of alkali is 2 mole Na/K (the theoretically required amounts shown in Equations (8), (9) and (13) are set to 100%); and the actual addition-to-theoretical-requirement ratio of alkali is equal to or more than 50% but less than 100%, preferably 55% to 80%, more preferably 55% to 75%, and most preferably 60% to 70%.

According to a specific embodiment of the present invention, in the method for producing alkali metal dichromate from carbon ferrochrome as the raw material according to the present invention, setting the oxygen amount required to oxidize the zero-valent elements C, Fe, Cr and Si in carbon ferrochrome into $CO_2$, $Fe_2O_3$, $CrO_3$ and $SiO_2$ as the theoretical amount (the sum of the theoretical oxygen amounts shown in Equations (1), (2), (3), (4) and (8) is set to 100%), the actual addition amount of the oxygen is 100% to 150%, preferably 110% to 130%, and most preferably 120% of the theoretical amount. In the present invention, pure oxygen gas or oxygen-containing mixed gas can be used for oxidation of the raw material ferrochrome, and it is preferable that the oxidizing gas charged into the reaction kettle is oxygen gas.

According to a specific embodiment of the present invention, in the method for producing alkali metal dichromate from carbon ferrochrome as the raw material according to the present invention, the mass ratio of the water to the carbon ferrochrome for formulating the initial reaction liquid is 1000:(100 to 300), preferably 1000:(150 to 250), and more preferably 1000:200, to facilitate proceeding of the reactions and simplify the subsequent processes.

According to a specific embodiment of the present invention, in the method for producing alkali metal dichromate from carbon ferrochrome as the raw material according to the present invention, the reaction temperature is 200° C. to 370° C., preferably 260° C. to 320° C., and more preferably 280° C. to 300° C.

According to a specific embodiment of the present invention, in the method for producing alkali metal dichromate from carbon ferrochrome as the raw material according to the present invention, the reaction time is 30 to 180 min, preferably 30 to 120 min, and more preferably 40 to 90 min; and the operation pressure in the autoclave is 2 MPa to 24 MPa.

According to a specific embodiment of the present invention, in the method for producing alkali metal dichromate from carbon ferrochrome as the raw material according to the present invention, after the reaction of step (2) is completed, the reaction products are cooled, depressurized, and vented to afford an alkali metal dichromate solution; or after the reaction of step (2) is completed, while the temperature is decreased and the partial pressure of carbon dioxide is held, crystals are filtered out to afford an alkali metal dichromate solution.

According to a specific embodiment of the present invention, the method for producing alkali metal dichromate with carbon ferrochrome as the raw material according to the present invention further comprises: the solid substance obtained in step (3) after the solid-liquid separation of the reaction products is hydrated ferric oxide filter cake, which is washed and dried for production of iron oxide pigments. That is, the filter cake separated from the alkali metal dichromate solution (a solution of alkali metal chromate and alkali metal dichromate with the latter being predominant) comprises hydrated ferric oxide $Fe_2O_3 \cdot yH_2O$ as the major component (and also comprises a small amount of hydrated silicic acid $SiO_2 \cdot xH_2O$), has a large specific surface area, and is suitable for production of iron oxide pigments. When the oxidation ratio of chromium is high, the obtained hydrated ferric oxide has a color of brownish red similar to that of iron (III) oxide red pigment, and after drying it may be directly used for production of anti-rust primers. When the oxidation ratio of chromium is relatively low, the obtained hydrated ferric oxide has a color of brownish black, and may be baked after supplemented and mixed with a suitable amount of manganese dioxide (or manganese ore fine), so as to produce chrome black, a pigment for coloring ceramics.

According to a specific embodiment of the present invention, in the method for producing alkali metal dichromate from carbon ferrochrome as the raw material according to the present invention, the crystal precipitated during the cooling in step (3) is alkali metal chromate, which may be further dehydrated and dried to produce a solid product of alkali metal chromate. In one specific embodiment of the present invention, the crystal obtained by separation is solid sodium chromate decahydrate, which may be further dehydrated and dried to produce sodium chromate tetrahydrate $Na_2CrO_4 \cdot 4H_2O$ or anhydrous sodium chromate.

EXAMPLES

In the following examples, all carbon ferrochromes used were the same, having a percentage composition by mass of Cr 49%, Fe 36%, C 8%, and Si 7%, and were pulverized to pass through a sieve having a mesh number of 200. 200 g carbon ferrochrome powder, 1000 ml water, and an alkali in a specified amount were put into a 3 L autoclave; the autoclave was sealed, into which pure oxygen gas was then charged to a specified pressure; the temperature was increased to a specified value under continuous stirring and was held under stirring for a certain period; the system was cooled to near the room temperature, depressurized and vented; then the product was filtered, and washed with water; the amount of the filtrate, as well as the Cr(VI) content, pH, and the degree of acidification therein, was measured; the amount of the used washing liquid, as well as the Cr(VI) content therein, was measured; and the oxidation ratio and the utilization rate of alkali were calculated from the amounts of the filtrate and the used washing liquid and the Cr(VI) contents therein.

In the present invention, the oxidation ratio of chromium refers to the percentage of oxidized Cr(VI) out of the total chromium in carbon ferrochrome. According to the present invention, the oxidation ratio of chromium can exceed 90%, and even be close to 100%.

In the present invention, the utilization rate of alkali refers to the oxidation ratio over the addition-to-theoretical-requirement ratio of alkali as a percentage. According to the present invention, the utilization rate of alkali can reach 150% or even higher.

In the present invention, the degree of acidification is a central-control index in production of sodium dichromate in the chromate industry, and refers to the percentage of the Cr(VI) in the form of sodium dichromate out of all Cr(VI), which is calculated from the equation below (see *Production and Application of Chromium Compounds*, 2003, Chemical Industry Press, page 109):

$$\text{Degree of acidification}(\%) = 3(NV)_{NaOH} \times 100/(NV)_{Fe2+}$$

The method for measuring the degree of acidification comprises: transferring 10.0 ml filtrate into a 500 ml volumetric flask, adding water thereto up to the mark for dilution, and shaking up the solution; transferring two 25.0 ml aliquots from the solution to conical flasks A and B, respectively; adding 10 ml sulfuric-phosphoric acid mixture and 3 drops of sodium diphenylamine sulfonate indicator to flask A, and titrating the solution with 0.1 N ferrous iron standard solution until the end point is reached; and adding 10 ml of 10% $BaCl_2$ neutral solution and 3 drops of 0.1% phenolphthalein indicator to flask B, shaking up the solution and titrating the solution with 0.1 N sodium hydroxide standard solution until the pink end point is reached. In the above equation, $(NV)_{NaOH}$ is the milliequivalent of the consumed sodium hydroxide (which is the product of the normality of the sodium hydroxide standard solution and the titrated volume in ml), and $(NV)_{Fe2+}$ is the milliequivalent of the ferrous iron (which is the product of the normality of the ferrous iron standard solution and the titrated volume in ml).

Example 1

200 g carbon ferrochrome powder, 1000 ml water, 190 g sal soda, and 10 g caustic soda (the addition-to-theoretical-requirement ratio of alkali was 100.04%) were charged into a 3 L autoclave; the autoclave was sealed, into which pure oxygen gas was then charged to a pressure of 7 MPa (the oxygen amount was 102.66% of the theoretical amount); the temperature was increased to 300° C. under continuous stirring and was held under stirring for 2 h; the system was cooled to 33° C.; and the products were discharged. The filtrate was 775 ml with a pH of about 6.5. The used washing liquid was 2100 ml with a pH of about 7 and a $NaHCO_3$ concentration of 4.12 g/l. The oxidation ratio was 99.98%.

This example demonstrates that (1) under the hydrothermal condition sal soda (sodium carbonate) can also participate in alkaline oxidation to oxidize Cr(III) into Cr(VI), (2) the oxidation ratio is almost 100%, proving that the chromium in carbon ferrochrome (which also comprises a little $Cr_3C_2$) can be completely oxidized, and (3) the used washing liquid had a $NaHCO_3$ concentration of 4.12 g/L, 8.65 g in total, showing that before the products were discharged the filter cake contained crystal sodium bicarbonate and the filtrate contained sodium dichromate (the degree of acidification is 17.79%).

Example 2

The experiment was conducted under the same conditions as those in Example 1, except that 10 g sal soda and 150 g baking soda (sodium bicarbonate) were used (the addition-to-theoretical-requirement ratio of alkali was 51.50%). The filtrate was 930 ml with a pH of 4 to 4.5 and a degree of acidification of 80.38%. The used washing liquid was 2950 ml with a pH of 5.5 to 6. The oxidation ratio was 80.75%. The utilization rate of alkali was 153.67%.

This example demonstrates that (1) under the hydrothermal condition baking soda (sodium bicarbonate) can also participate in alkaline oxidation to oxidize Cr(III) into Cr(VI), (2) the oxidation ratio is greater than the addition-to-theoretical-requirement ratio of alkali, and the utilization rate of alkali is as high as 153.67%, proving that sodium bicarbonate provided extra $CO_2$, increased the partial pressure of $CO_2$ ($P_{CO2}$), enhanced the catalytic function of $CO_2$, and promoted acidification shown in Equation (10), so that the newly produced sodium bicarbonate further participates in alkaline oxidation in accordance with Equations (13) and (14) to increase the oxidation ratio and the degree of acidification, and (3) the degree of acidification is 80.38%, i.e., sodium dichromate is 80.38% of the Cr(IV) in the filtrate, with sodium chromate less than 20%.

Example 3

This example was conducted under the same conditions as those in Example 1, except that 90 g caustic soda was used alone (the addition-to-theoretical-requirement ratio of alkali was 58.69%), the oxygen was charged to a pressure of 8.5 MPa (the oxygen amount was 124.66% of the theoretical amount), and the temperature holding time under stirring was 1 h. The filtrate was 900 ml with a pH of 4 and a degree of acidification of 75.69%. The used washing liquid was 3300 ml with a pH of 6. The oxidation ratio was 86.16%. The utilization rate of alkali was 143.87%.

Example 4

This example was conducted under the same conditions as those in Example 3, except that 105 g caustic soda was used (the addition-to-theoretical-requirement ratio of alkali was 68.47%). The filtrate was 880 ml with a pH of 4 to 4.5 and a degree of acidification of 60.07%. The used washing liquid was 3400 ml with a pH of 6. The oxidation ratio was 95.21%. The utilization rate of alkali was 136.27%.

Example 5

This example was conducted under the same conditions as those in Example 3, except that 120 g caustic soda was used (the addition-to-theoretical-requirement ratio of alkali was 78.26%). The filtrate was 895 ml with a pH of 4 to 4.5 and a degree of acidification of 53.42%. The used washing liquid was 3600 ml with a pH of 6.5. The oxidation ratio was 98.64%. The utilization rate of alkali was 123.53%.

Example 6

This example was conducted under the same conditions as those in Example 3, except that 135 g caustic soda was used (the addition-to-theoretical-requirement ratio of alkali was 88.04%). The filtrate was 900 ml with a pH of 5 and a degree of acidification of 39.75%. The used washing liquid was 3600 ml with a pH of 6.5 to 7. The oxidation ratio was 96.88%. The utilization rate of alkali was 107.84%.

Figure 2:
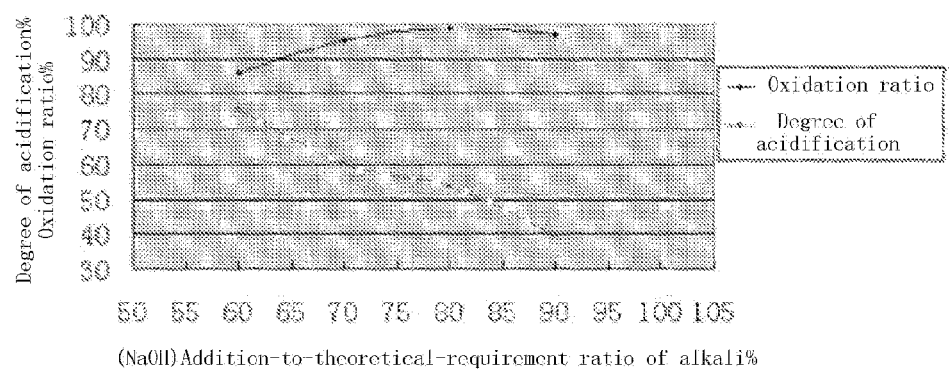
FIG. 2 shows the relationship between the addition-to-theoretical-requirement ratio of sodium hydroxide, the oxidation ratio, and the degree of acidification in the method according to the present invention.

Based on the experimental results of Examples 3-6, the oxidation ratio, degree of acidification, and addition-to-theoretical-requirement ratio of alkali in the present invention are compared to illustrate their relationship, and as shown in FIG. 2, with increase of the addition-to-theoretical-requirement ratio of sodium hydroxide, the oxidation ratio increases and the degree of acidification decreases. In addition, as long as the addition-to-theoretical-requirement ratio of alkali is lower than the theoretically required value, the utilization rate of alkali will be greater than 100%; and the smaller the addition-to-theoretical-requirement ratio of alkali is, the greater the utilization rate of alkali will be. As long as the addition-to-theoretical-requirement ratio of alkali is lower than the theoretically required value, the pH of the filtrate will be about 4.5.

Example 7

This example was conducted under the same conditions as those in Example 1, except that 19 g caustic soda and 95 g sal soda were used, the oxygen was charged to a pressure of 7.5 MPa (the oxygen amount was 109.99% of the theoretical amount), and the temperature holding time was 1.5 h, wherein the caustic soda and the sal soda were used as a mixture (the total addition-to-theoretical-requirement ratio of alkali was 59.15%, and caustic soda accounted for 20.95% of the added alkali with the rest being sal soda). The filtrate was 840 ml with a pH of 4 to 5 and a degree of acidification of 72.32%.

The used washing liquid was 3300 ml with a pH of 6. The oxidation ratio was 93.95%. The utilization rate of alkali was 155.65%.

Example 8

This example was conducted under the same conditions as those in Example 7, except that the temperature holding time was 1 h. The filtrate was 950 ml with a pH of 4 to 4.5 and a degree of acidification of 61.66%. The used washing liquid was 2400 ml with a pH of 6 to 6.5. The oxidation ratio was 84.43%. The utilization rate of alkali was 139.88%.

Example 9

This example was conducted under the same conditions as those in Example 8, except that the oxygen was charged to a pressure of 8.8 MPa (the oxygen amount was 129.06% of the theoretical amount). The filtrate was 860 ml with a pH of 4 and a degree of acidification of 73.19%. The used washing liquid was 2700 ml with a pH of 6. The oxidation ratio was 91.92%. The utilization rate of alkali was 152.29%.

Example 10

200 g carbon ferrochrome powder, 1000 ml water, and 95 g caustic soda (the addition-to-theoretical-requirement ratio of alkali was 61.95%) were charged into a 3 L autoclave; the autoclave was sealed, into which pure oxygen gas was then charged to a pressure of 6.5 MPa (the oxygen amount was 95.33% of the theoretical amount); the temperature was increased to 300° C. under continuous stirring and was held under stirring for 1 h; the system was cooled to 31° C.; and the products were discharged. The filtrate was 910 ml with a pH of 4.5 to 5 and a degree of acidification of 70.00%. The used washing liquid was 2400 ml with a pH of 6. The oxidation ratio was 86.92%. The utilization rate of alkali was 137.50%.

Example 11

This example was conducted under the same conditions as those in Example 10, except that pure oxygen was charged to a pressure of 7.3 MPa (the oxygen amount was 107.76% of the theoretical amount). The filtrate was 920 ml with a pH of 4.5 to 5 and a degree of acidification of 68.30%. The used washing liquid was 3400 ml with a pH of 6.5 to 7. The oxidation ratio was 87.12%. The utilization rate of alkali was 137.81%.

Example 12

This example was conducted under the same conditions as those in Example 10, except that pure oxygen was charged to a pressure of 8.1 MPa (the oxygen amount was 118.79% of the theoretical amount). The filtrate was 904 ml with a pH of 4 to 4.5 and a degree of acidification of 70.89%. The used washing liquid was 3100 ml with a pH of 6. The oxidation ratio was 89.62%. The utilization rate of alkali was 141.77%.

Example 13

This example was conducted under the same conditions as those in Example 10, except that pure oxygen was charged to a pressure of 8.8 MPa (the oxygen amount was 129.06% of the theoretical amount). The filtrate was 910 ml with a pH of 4.5 to 5 and a degree of acidification of 68.12%. The used washing liquid was 3700 ml with a pH of 6.5. The oxidation ratio was 90.06%. The utilization rate of alkali was 142.46%.

Example 14

This example was conducted under the same conditions as those in Example 10, except that pure oxygen was charged to a pressure of 9.5 MPa (the oxygen amount was 139.32% of the theoretical amount). The filtrate was 925 ml with a pH of 4 and a degree of acidification of 71.30%. The used washing liquid was 3000 ml with a pH of 6.5 to 7. The oxidation ratio was 91.96%. The utilization rate of alkali was 145.47%.

Example 15

This example was conducted under the same conditions as those in Example 10, except that pure oxygen was charged to a pressure of 10.2 MPa (the oxygen amount was 149.59% of the theoretical amount). The filtrate was 900 ml with a pH of 4 to 4.5 and a degree of acidification of 74.58%. The used washing liquid was 2900 ml with a pH of 6. The oxidation ratio was 93.71%. The utilization rate of alkali was 148.24%.

Example 16

The filtrates obtained from the above examples that have a degree of acidification greater than 70% were combined, and concentrated until the concentration of $Na_2Cr_2O_7 \cdot 2H_2O$ was 800 g/l. 400 ml of the concentrated solution was taken out, cooled to $-12°$ C. to precipitate crystals of sodium chromate decahydrate $Na_2CrO_4 \cdot 10H_2O$, and then filtered to afford the product sodium chromate decahydrate, where the degree of acidification in the filtrate was increased to 93%. The filtrate was cooled to $-12°$ C. again to precipitate crystals of sodium chromate decahydrate, and the degree of acidification in the filtrate after the precipitation was increased to 97%. Chromic anhydride $CrO_3$ was added to further increase the degree of acidification to 100.2%. The solution was concentrated by evaporation and cooled to precipitate crystals, so as to afford the product sodium dichromate dihydrate crystal, 98.38% of which was $Na_2Cr_2O_7 \cdot 2H_2O$.

The invention claimed is:

1. A method for producing alkali metal dichromate from carbon ferrochrome as the raw material through a hydrothermal process, the method comprising the steps of
   (1) formulating the raw material carbon ferrochrome together with an alkali and water into an initial reaction liquid, in which the actual addition-to-theoretical-requirement ratio of the alkali in oxidizing chromium in the carbon ferrochome to form alkali metal chromate is 55% to 80%;
   (2) adding the initial reaction liquid formulated in step (1) into a reaction kettle, charging an oxidizing gas into the reaction kettle, and allowing a reaction to proceed for 0.5 to 3 h at a temperature of 150° C. to 370° C. and a pressure of 2 MPa to 24 MPa, wherein $CO_2$ generated during the reaction exerts a catalytic function which directs the reaction to produce a mixed solution of alkali metal chromate and alkali metal dichromate with the latter being predominant, wherein alkali metal bicarbonate generated during the reaction is used as a further alkali source for further alkaline oxidation of chromium (III) to alkali metal chromate, and the alkali metal bicarbonate further releases $CO_2$ to further acidify the alkali metal chromate to alkali metal dichromate, thereby resulting in an oxidation ratio of chromium, defined as a percentage of chromium(VI) out of the total chromium in the carbon ferrochrome, greater than the actual addition-to-theoretical-requirement ratio of the alkali, and a degree of acidification greater than 50%; and (3) subjecting the reaction products from the reaction in step (2) to solid-liquid separation, cooling the resultant filtrate to a temperature of −12° C. to −20° C. to precipitate crystals, and separating the solution therefrom which is an alkali metal dichromate solution.

2. The method for producing alkali metal dichromate from carbon ferrochrome as the raw material through a hydrothermal process according to claim 1, the method further comprising the step of (4) adding $CrO_3$ to the alkali metal dichromate solution obtained in step (3) until the degree of acidification reaches 100% or greater, concentrating the solution by evaporation, and cooling it to precipitate crystals, so as to afford a solid product of alkali metal dichromate.

3. The method for producing alkali metal dichromate from carbon ferrochrome as the raw material according to claim 1, wherein the alkali metal dichromate is sodium dichromate, potassium dichromate, or lithium dichromate; and the alkali used to formulate the initial reaction liquid is one or more selected from sodium hydroxide, potassium hydroxide, lithium hydroxide, sodium carbonate, potassium carbonate, lithium carbonate, sodium bicarbonate, and potassium bicarbonate, where the actual addition-to-theoretical-requirement ratio of alkali is 60% to 70%.

4. The method for producing alkali metal dichromate from carbon ferrochrome as the raw material according to claim 1, wherein the reaction time is 40 to 90 min.

5. The method for producing alkali metal dichromate from carbon ferrochrome as the raw material according to claim 1, further comprising: the solid substance obtained in step (3) after the solid-liquid separation of the reaction products is hydrated ferric oxide filter cake, which is washed and dried for production of iron oxide pigments.

6. The method for producing alkali metal dichromate from carbon ferrochrome as the raw material according to claim 1, further comprising: the crystal precipitated during the cooling in step (3) is alkali metal chromate, which is further dehydrated and dried to produce a solid product of alkali metal chromate.

7. The method for producing alkali metal dichromate from carbon ferrochrome as the raw material according to claim 1, wherein after the reaction of step (2) is completed, the reaction products are cooled, depressurized, and vented to afford an alkali metal dichromate solution; or after the reaction of step (2) is completed, while the temperature is decreased and the partial pressure of carbon dioxide is held, crystals are filtered out to afford an alkali metal dichromate solution.

8. The method for producing alkali metal dichromate from carbon ferrochrome as the raw material according to claim 1, wherein in the alkali metal dichromate solution obtained after crystals are precipitated by cooling the solution of the reaction products to a temperature of −12° C. to −20° C., the degree of acidification is 97% or more.

9. The method for producing alkali metal dichromate from carbon ferrochrome as the raw material according to claim 1, wherein the raw material carbon ferrochrome is one or more of high-carbon ferrochrome, medium-carbon ferrochrome and charge chrome, and has been pulverized to have a particle size of smaller than 75 μm before the formulation of the initial reaction liquid.

10. The method for producing alkali metal dichromate from carbon ferrochrome as the raw material according to claim 9, wherein said particle size is smaller than 43 μm before the formulation of the initial reaction liquid.

11. The method for producing alkali metal dichromate from carbon ferrochrome as the raw material according to claim 1, wherein the oxidizing gas charged into the reaction kettle is oxygen gas, and the actual addition amount of the oxygen gas is 100% to 150% of a theoretical amount that is defined as a total amount of oxygen required in reactions to oxidize zero-valent elements of C, Fe, Cr and Si in carbon ferrochrome and to form alkali metal chromate.

12. The method for producing alkali metal dichromate from carbon ferrochrome as the raw material according to claim 11, wherein the actual addition amount of the oxygen gas is 110% to 130% of the theoretical amount.

13. The method for producing alkali metal dichromate from carbon ferrochrome as the raw material according to claim 11, wherein the actual addition amount of the oxygen gas is 120% of the theoretical amount.

14. The method for producing alkali metal dichromate from carbon ferrochrome as the raw material according to claim 1, wherein the mass ratio of the water to the carbon ferrochrome for formulating the initial reaction liquid is 1000:(100 to 300).

15. The method for producing alkali metal dichromate from carbon ferrochrome as the raw material according to claim 1, wherein the mass ratio of the water to the carbon ferrochrome for formulating the initial reaction liquid is 1000:(150 to 250).

16. The method for producing alkali metal dichromate from carbon ferrochrome as the raw material according to claim 1, wherein the mass ratio of the water to the carbon ferrochrome for formulating the initial reaction liquid is 1000:200.

17. The method for producing alkali metal dichromate from carbon ferrochrome as the raw material according to claim 1, wherein the temperature of the reaction in the reaction kettle is at 200° C. to 370° C.

18. The method for producing alkali metal dichromate from carbon ferrochrome as the raw material according to claim 1, wherein the temperature of the reaction in the reaction kettle is at 260° C. to 320° C.

19. The method for producing alkali metal dichromate from carbon ferrochrome as the raw material according to claim 1, wherein the temperature of the reaction in the reaction kettle is at 280° C. to 300° C.

* * * * *